United States Patent

Marchisio et al.

[11] Patent Number: 5,090,541
[45] Date of Patent: Feb. 25, 1992

[54] COUPLING DEVICE FOR A DECLUTCHING MEMBER, ESPECIALLY FOR AUTOMOTIVE VEHICLES

[75] Inventors: Aldo Marchisio, Moncaliera; Massimo Guarise, Santena, both of Italy

[73] Assignee: Valeo, Paris, France

[21] Appl. No.: 532,645

[22] Filed: Jun. 4, 1990

[30] Foreign Application Priority Data

Jun. 7, 1989 [FR] France .................. 89 07538

[51] Int. Cl.⁵ .............................. F16D 23/14
[52] U.S. Cl. .................... 192/98; 192/89 B; 192/70.13; 192/DIG. 1
[58] Field of Search ............ 192/98, 89 B, 70.13, 192/DIG. 1

[56] References Cited

U.S. PATENT DOCUMENTS

| | | | |
|---|---|---|---|
| 4,456,111 | 6/1984 | Limbacher | 192/98 X |
| 4,646,898 | 3/1987 | Muller | 192/98 |
| 4,648,499 | 3/1987 | Despres et al. | 192/98 |
| 4,660,701 | 4/1987 | Lassiaz et al. | 192/98 |
| 4,733,762 | 3/1988 | Gay | 192/98 |
| 4,782,935 | 11/1988 | Gay | 192/98 |
| 4,903,807 | 2/1990 | Kabayama et al. | 192/89 B X |
| 4,967,891 | 11/1990 | Takeuchi | 192/89 B X |

FOREIGN PATENT DOCUMENTS

| | | |
|---|---|---|
| 2633353 | 12/1989 | France . |
| 2182111 | 5/1987 | United Kingdom . |
| 2193284 | 2/1988 | United Kingdom . |
| 8809883 | 12/1988 | World Int. Prop. O. ............ 192/98 |

Primary Examiner—Leslie A. Braun
Assistant Examiner—Andrea Pitts
Attorney, Agent, or Firm—Longacre & White

[57] ABSTRACT

A coupling device comprises a coupling member and a connecting piece extending within a sleeve portion of the coupling member. The connecting piece includes at least two toe portions, each of which extends individually and locally through the sleeve portion of the coupling member, via openings which are formed in the latter. A retaining member, carried on the coupling member, is provided for the retention of the connecting piece. The retaining member carries at least two centering and retaining fingers, each of which cooperates with one of the toe portions of the connecting piece.

8 Claims, 2 Drawing Sheets

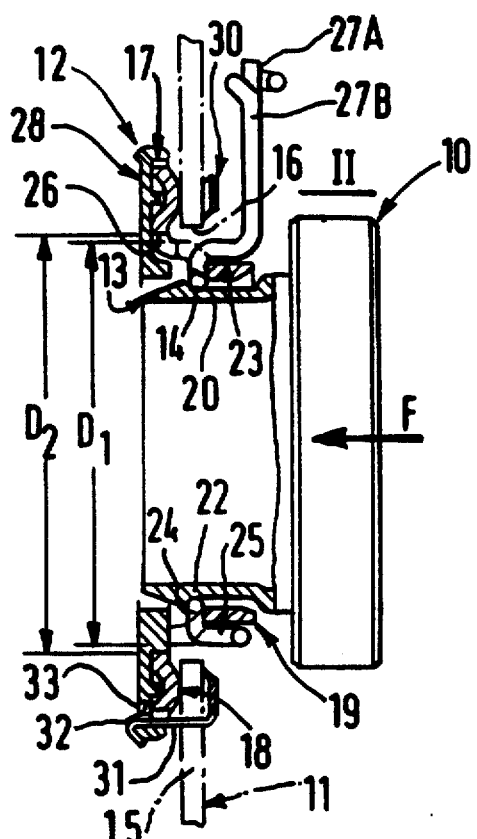
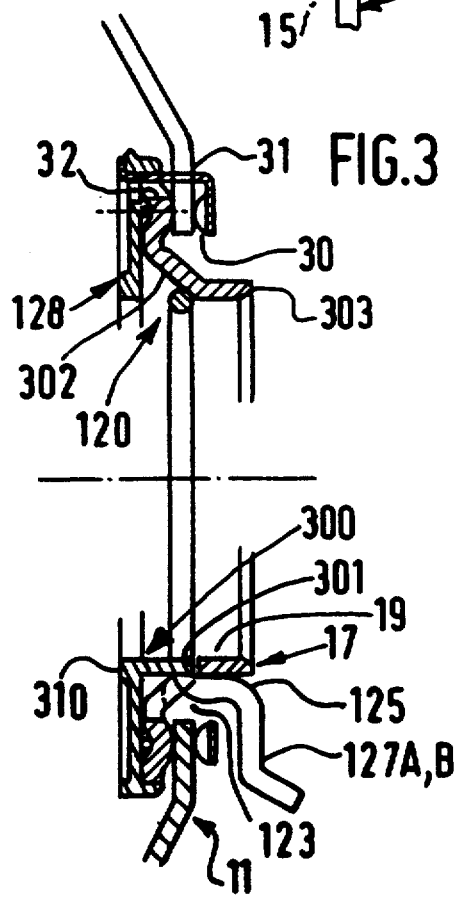
FIG. 1 (PRIOR ART)
FIG. 3
FIG. 4

COUPLING DEVICE FOR A DECLUTCHING MEMBER, ESPECIALLY FOR AUTOMOTIVE VEHICLES

FIELD OF THE INVENTION

This invention relates to the control of clutches, and more particularly to devices for coupling to the diaphragm of a clutch a declutching member which acts intraction on the diaphragm.

BACKGROUND OF THE INVENTION

One device of the above kind is described in published French patent specification No. FR 2 633 353A. In that document, the required coupling is achieved using a coupling device which comprises a coupling member and a connecting piece. The coupling member includes a collar portion through which the coupling member is engaged on the diaphragm itself, on the side of the latter opposite to the declutching member. The coupling member also includes a sleeve portion which is adapted to extend through the central opening in the diaphragm. The connecting piece is made of round wire and has a main portion in the form of a ring, which is disposed within the sleeve portion and which is made so as to be deformable resiliently in the radial direction.

The connecting piece is arranged to be attached to the declutching member by means of a simple snap fit of the latter, and also includes at least two toe portions for retaining it on the coupling member. Each of these toe portions includes a radial portion extending in the plane of the main portion of the connecting piece. Each of the toe portions extends individually and locally through the sleeve portion of the coupling member, via openings which are provided in the latter for this purpose. A retaining member is carried axially on the coupling member, either directly or indirectly. This retaining member is provided for the purpose of retaining the connecting piece on the side of the collar portion of the coupling member which lies opposite to the declutching member. For ensuring that the connecting piece remains centred on the coupling member, each toe portion also has an axial portion which extends into the immediate vicinity of the outer periphery of the sleeve portion. Such axial portions complicate the manufacture of the connecting piece.

Two of the toe portions are defined by a local deformation of the connecting piece such that the axial portions necessitate bending in an axial direction, which itself complicates the manufacture of such toe portions.

DISCUSSION OF THE INVENTION

An object of the present invention is to overcome these disadvantages without significantly altering the coupling device, and while also obtaining further advantages.

In accordance with the invention, a coupling device of the kind mentioned above is characterised in that the retaining member carries at least two retaining or centring fingers for cooperation of each retaining finger with a toe portion of the connecting piece.

The invention simplifies the connecting piece, in which two of its toe portions each consist of a radial portion only, while advantage is taken of the retaining member such that the coupling member is able to remain unaltered. The same is true as regards the actuating element which forms part of the declutching member in the conventional way.

It will be appreciated that the fitting of the connecting piece on to the coupling member may be carried out to advantage without any particular difficulty, with the retaining member being mounted last.

The invention is illustrated in more detail in the following description, which is given by way of example and with reference to the accompanying drawings.

BRIEF DESCRIPTION OF THE DRAWINGS

FIG. 1 is a view in cross section, identical to FIG. 1 of French published patent specification No. FR 2 638 353A, of a coupling device with, in phantom lines, a portion of the diaphragm with which it is associated.

FIG. 3 is a view in cross section taken on the line A—A in FIG. 2.

FIG. 4 is a view in cross section taken on the line B—B in FIG. 2.

DESCRIPTION OF A PREFERRED EMBODIMENT OF THE INVENTION

Figure 2:
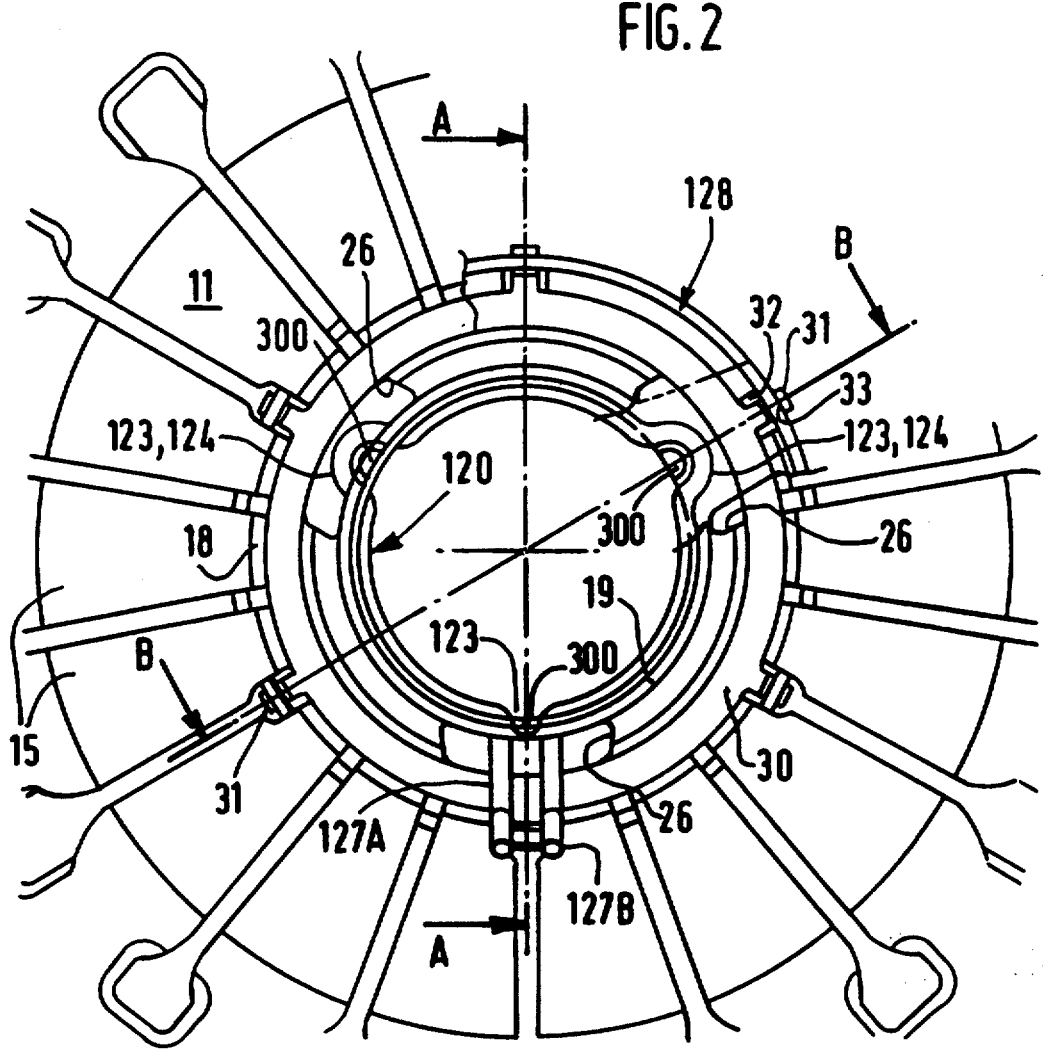
FIG. 2 is a view in elevation of a coupling device in accordance with the invention, shown partly cut away.

In general terms a coupling device 12 is provided for coupling together a declutching member 10 and the diaphragm 11 of a clutch, so that the declutching member acts in traction on the diaphragm.

Referring to the prior art arrangement shown in FIG. 1, it will be seen that the operative part of the declutching member 10 comprises an actuating element 13 which is provided with a shoulder 14 on its outer periphery. For greater detail, reference is directed to U.S. Pat. No. 4,782,935 or the corresponding French published patent specification No. FR 2 597 560A, in which the actuating element is constituted by the extension of the outer bearing ring of a ball bearing.

The diaphragm 11 has a central portion comprising a set of radial fingers 15, which in FIG. 2 are offset axially at their inner end. The central portion of the diaphragm defines an axial central opening 16 (FIG. 1). The fingers 15 are separated from each other by gaps.

The coupling device 12 comprises a coupling member 17 and a connecting piece 20. The coupling member 17, which in this example is a sheet metal pressing, includes a collar portion 18 having an arched transverse profile so as to bear on the diaphragm 11 on the side of the latter opposite to the declutching member 10. The coupling member 17 also includes a sleeve portion 19 which extends through the central opening 16 of the diaphragm 11. The connecting piece 20 comprises a main portion 22, generally in the form of a ring, which is disposed inside the sleeve portion 19 and is resiliently deformable in the radial direction. The connecting piece 20 is arranged to be attached to the declutching member 10 by a simple snap fit. The sleeve portion 19 is arranged in a generally axial orientation.

In FIG. 1, the connecting piece 20 includes, for maintaining it centred with respect to the coupling element 17, at least two toe portions 23, each comprising a radial portion 24 and an axial portion 25, and each of which individually extends locally through the sleeve portion 19, by means of openings 26 which are provided in the coupling member 17. The radial portions 24 are here in the plane of the circular main portion 22 of the connecting piece 20.

More particularly, the connecting piece 20, which is made of round wire, has three toe portions 23 spaced apart at 120 degrees. The main portion 22 is discontinuous in that it is open between two terminal finger portions 27A and 27B, which extend from the end of the axial portion 25 of one of its toe portions 23.

A retaining member 28, which is suitably attached, either directly or indirectly, axially to the coupling member 17, is provided for retaining the connecting piece 20 on the side of the collar portion 18 opposite to the declutching member 10. The openings 26 in the sleeve portion 19, which have a closed contour, also extend into the collar portion 18, being formed with an extension which is large enough to enable the connecting piece 20 to be fitted at the side of the collar portion 18. The retaining member 28 has at its outer periphery a circular stiffening flange which is directed axially towards the diaphragm. This flange engages on the outer periphery of the collar portion 18, so as to centre the retaining member 28. During the operation of snap fitting the connecting piece 20 on the declutching member 10, the retaining member 28 ensures that the connecting piece 20 is retained at its inner periphery.

In FIG. 1, the retaining member 28 is made of a synthetic material, and its engagement with the coupling member 17 is ensured indirectly, i.e. through the diaphragm 11, by means of a corrugated resilient ring 30. The ring 30 is arranged on the side of the diaphragm 11 opposite to the collar portion 18, and it is provided so as to hold the collar portion 18 resiliently against the diaphragm 11.

Spaced apart on the outer periphery of the ring 30 are axially extending locating tabs 31 which extend successively through: the diaphragm 11, each between two of the fingers 15 of the latter; the collar portion 18 via slots 32 which are provided for this purpose on its outer periphery; and the retaining member 28 via holes 33 which are formed in the latter in line with the slots 32. The locating tabs 31 are hooked on to the retaining member 28 beyond the holes 33, by means of a rounded curl which is directed away from the axis of the assembly.

In FIGS. 2 to 4, which show the embodiment of the invention now to be described, those elements which are the same as those in FIG. 1 are indicated by the same reference numerals as in FIG. 1, while other elements, which appear in a modified form, are given the same reference numerals but with 100 added.

Referring now to FIG. 2, the retaining member 128 carries at least two centring or retaining fingers 300, each of which cooperates with a toe portion 123 of the connecting piece 120. In this example there are three of these centring fingers 300, this being the same as the number of toe portions 123. They project from the inner periphery of the member 128 and extend axially as far as the vicinity of the circumferential edge 301 of the opening 26 furthest from the collar portion 18. The edge 301 is situated in the region in which a frusto-conical portion 302 of the sleeve portion 19 joins the free end portion 303 of the latter. The free end 303 is generally cylindrical and orientated axially. The frusto-conical portion 302 thus joins the end portion 303 to the collar portion 18.

As can be seen in FIGS. 3 and 4, there is a narrow gap between the edge 301 and the free ends of the fingers 300. In this example, the fingers 300 extend within the sleeve portion 19 in axial alignment with the free end portion 303 and within the frusto-conical portion 302. In this way advantage is taken of the space available within the frusto-conical portion 302.

The three toe portions 123 of the connecting piece 120, which is again made of round wire, each comprise a radial portion 124 lying in the plane of the main ring portion 122 of the connecting piece 120, which is disposed within the sleeve portion 19. The toe portions 123 extend radially through the openings 26. Two of the toe portions 123 lie wholly in the plane of the main portion 122, and each of these two is defined by a simple local deformation of the portion 122, being shaped in the form of semi-circular ears. The fingers 300 have a cross section of semi-circular shape so as be to adapted to the internal countour of the ears 123. These two ears 123 are offset from each other by 120 degrees, and each of them is associated with one of the openings 26. As can best be seen from FIG. 2, the circumferential width of the toe portions 123 is smaller than that of the openings 26, and the same is true for the fingers 300.

Through the third opening 26, there extend two finger portions 127A and 127B of the connecting piece 120, each of which extends from the end of a short axial portion 125 of the latter. These fingers together constitute the third toe portion 123. The connecting piece 120 is thus threaded on the fingers 300; and it should be noted that bending of the axial portions 125 does not need to be particularly precise.

The retaining member 128 is preferably made of a plastics material. It has an L-shaped cross section, the base of which is defined by the centring fingers 300 with which it is made integral. To this end, the member 128 has at its inner periphery a stiffening rib 310 which is directed away from the collar portion 18. The connecting piece 120 can thus be fitted beside the collar portion 18 by means of a simple axial engagement of the member 120, after it has been presented obliquely into the corresponding opening 26 in the coupling member 17 so as to allow the finger portions 127A and 127B to pass. The retaining member 128 is then finally mounted after the member 120 has been positioned.

The openings 26 have a circumferential dimension which is large enough to allow the connecting piece 120 to deform resiliently in a circumferential sense, both during its fitting or removal and while the declutching member 10 is being snap fitted.

It will be appreciated that the retaining member 128 ensures the necessary retention of the connecting piece 120 during the snap fitting of the latter to the declutching member 10, by engagement of the actuating element 13 in the sleeve portion 19. After snap fitting has been effected, the connecting piece 120 is interposed between the shoulder 14 and the inner periphery of the frusto-conical portion 302.

As will also be gathered from the foregoing description and from the drawings, it thus becomes possible to reduce the circumferential size of the openings 26, due to the reduction in the circumferential length of the toe portions 123. The openings 26 may, as indicated in broken lines in FIG. 3, not extend into the collar portion 18 due to the shape of the connecting piece 120. The collar portion 18 is thus able to be made more rigid.

It will be appreciated that the retaining fingers 300 ensure that the connecting piece 120 is maintained in position with a circumferential clearance, with the retaining member 128 being prevented from rotating by virtue of the resilient gripping action of the ring 30. In a modification, the retaining member 128 may have some thickened portions, arranged locally at its outer periphery and engaging with slots of the kind seen at 32 in FIGS. 1 and 3, while being separate from the latter.

The present invention is of course not limited to the embodiments described. In particular, whereas in FIGS. 2 to 4, the finger portions 127A and 127B extend radially, the opening up of the connecting piece 120 being achieved using a tool to force the finger portions 127A and 127B apart for removal of the declutching member 10, it is possible to adopt the arrangement of FIG. 1 by using finger portions hooked over each other.

The fingers 300 may of course be carried on the retaining member 128 itself. Instead of the ears 123, toe portions of the connecting piece may take some other form, given that in every case the connecting piece 120 is to be threaded over the centring and retaining fingers 300.

In certain cases, the centring fingers 300 may extend radially beyond the free end portion 303 of the member 17, and in particular when the central opening 16 of the diaphragm 11, which determines the dimensions of the toe portions 123, is such as to permit this. Similarly, the fingers 300 may be arranged so that they do not project from the inner periphery of the retaining member 128.

Finally, the retaining member may be of metal, and may be carried directly on the collar portion of the coupling member. It may indeed be secured on the collar portion. The coupling member may be of the same kind as that which is described in the above mentioned U.S. Pat. No. 4,782,935, in which case the presence of the ring 30 is no longer necessary.

What is claimed is:

1. A coupling device for coupling a declutching member with a clutch diaphragm defining a central opening, for the declutching member to act in traction on the diaphragm, the coupling device comprising a coupling member and a connecting piece, the coupling member having a collar portion for engaging the diaphragm on a side of the latter opposite to the declutching member, the coupling member further having a sleeve portion defining openings therethrough and being adapted to extend through the diaphragm via the said central opening of the latter, the connecting piece comprising a main portion in the form of a ring disposed within said sleeve portion and being resiliently deformable in the radial direction, the connecting piece further comprising, for its retention with respect to the coupling member, at least two toe portions, each having a radial portion extending in a plane of said main portion, and each extending locally through a respective said opening of the sleeve portion, the device further including a retaining member axially carried on the coupling member for retaining the connecting piece on a side of the collar portion opposite to the declutching member, wherein the retaining member includes at least two retaining or centering fingers for cooperation of each said retaining finger with a respective one of said toe portions.

2. A coupling device according to claim 1, wherein said retaining fingers are carried on an inner periphery of said retaining member.

3. A coupling device according to claim 1 or claim 2, wherein said retaining fingers extend axially into a vicinity of a circumferential edge of said opening formed in said sleeve portion furthest from said collar portion.

4. A coupling device according to claim 1, in which the sleeve portion of the coupling member has a frusto-conical portion joining its said sleeve portion to its said collar portion, with said retaining fingers extending within said frusto-conical portion.

5. A coupling device according to claim 4, wherein the connecting piece has two said toe portions lying in the plane of said main portion of the connecting piece, with each of said toe portions being defined by a local deformation of said main portion into the form of a semi-circular ear, said retaining fingers being semi-circular in cross section for cooperation with an internal profile of said ears.

6. A coupling device according claim 1, wherein the connecting piece is threaded on said retaining fingers.

7. A coupling device according to claim 2, wherein said retaining fingers extend axially into a vicinity of the circumferential edge of said opening formed in said sleeve portion furthest from said collar portion.

8. A coupling device according to claim 1, wherein the retaining member has an L-shaped cross section and wherein said retaining fingers are carried on a base of said retaining member.

* * * * *